United States Patent
Shibayama et al.

[11] Patent Number: 5,379,154
[45] Date of Patent: Jan. 3, 1995

[54] HIGH VARIABLE POWER RATIO ZOOM LENS

[75] Inventors: Atsushi Shibayama, Kawasaki; Susumu Sato, Chiba, both of Japan

[73] Assignee: Nikon Corporation, Tokyo, Japan

[21] Appl. No.: 97,030

[22] Filed: Jul. 27, 1993

[30] Foreign Application Priority Data

Aug. 7, 1992 [JP] Japan .................. 4-211221

[51] Int. Cl.$^6$ ............................................. G02B 15/14
[52] U.S. Cl. ........................ 359/689; 359/684; 359/686
[58] Field of Search ............. 359/689, 686, 687, 684

[56] References Cited

U.S. PATENT DOCUMENTS

| | | | |
|---|---|---|---|
| 4,840,467 | 6/1989 | Takada et al. | 359/689 |
| 4,854,682 | 8/1989 | Yamanashi | 359/689 |
| 4,911,539 | 3/1990 | Tsunashima et al. | 359/692 |
| 4,978,204 | 12/1990 | Ito | 359/689 |
| 4,983,027 | 1/1991 | Kojima et al. | 359/689 |
| 5,194,991 | 3/1993 | Yamanashi | 359/689 |

Primary Examiner—Scott J. Sugarman
Attorney, Agent, or Firm—Shapiro and Shapiro

[57] ABSTRACT

In a zoom lens having, in succession from the object side, a first lens unit having positive refractive power, a second lens unit having positive refractive power, and a third lens unit having negative refractive power, the spacing between the first lens unit and the second lens unit being increased and the spacing between the second lens unit and the third lens unit being decreased during the magnification change from the wide angle end to the telephoto end, the first lens unit has at least one positive lens and at least one negative lens, the second lens unit comprises, in succession from the object side, a front group of weak refractive power and a rear group of positive refractive power, the front group having at least one negative lens and at least one positive lens, the rear group having, in succession from the object side, at least one positive lens, at least one negative lens and at least one positive lens, and the third lens unit has at least one positive lens and at least one negative lens. The zoom lens satisfies predetermined conditions.

34 Claims, 1 Drawing Sheet

HIGH VARIABLE POWER RATIO ZOOM LENS

BACKGROUND OF THE INVENTION

1. Field of the Invention

This invention relates to a zoom lens of a short back focal length suitable for a compact camera.

2. Related Background Art

In recent years, there have been proposed various zoom lenses suitable for compact cameras. For example, as disclosed in U.S. Pat. No. 4,911,539, there has been proposed a zoom lens of two-unit construction comprising, in succession from the object side, a lens unit of positive refractive power and a lens unit of negative refractive power.

However, it has been very difficult to make a high zoom ratio and an excellent imaging performance compatible.

SUMMARY OF THE INVENTION

It is the object of the present invention to provide a zoom lens of a high variable power ratio having a relatively short full length and a compact shape and excellent in imaging performance.

A zoom lens according to the present invention is a zoom lens having, in succession from the object side, a first lens unit G1 having positive refractive power, a second lens unit G2 having positive refractive power, and a third lens unit G3 having negative refractive power, the spacing between the first lens unit G1 and the second lens unit G2 being increased and the spacing between the second lens unit G2 and the third lens unit G3 being decreased during the magnification change from the wide angle end to the telephoto end, the first lens unit G1 having at least one positive lens and at least one negative lens, the second lens unit G2 comprising, in succession from the object side, a front group GF of weak refractive power and a rear group GR of positive refractive power, the front group having at least one negative lens and at least one positive lens, the rear group having, in succession from the object side, at least one positive lens LR1, at least one negative lens and at least one positive lens, the third lens unit G3 having at least one positive lens and at least one negative lens.

Further, the zoom lens according to the present invention is of a construction which satisfies the following conditional expressions:

$$-0.3 \leq f2/fF \leq 0.3 \quad (1)$$
$$0.7 \leq f2/fR \leq 1.3 \quad (2)$$
$$0.4 \leq fW/f1 \leq 0.8 \quad (3)$$
$$1.0 \leq fW/f2 \leq 1.5 \quad (4)$$
$$1.0 \leq |fW/f3| \leq 2.0 \sim f3 < 0 \quad (5)$$
$$-1.0 \leq IIRT \leq 3.0 \quad (6)$$
$$0.1 \leq D/fR \leq 0.3 \quad (7)$$
$$40 \leq \nu P - \nu N \quad (8)$$

where f1 is the focal length of said first lens unit G1, f2 is the focal length of said second lens unit G2, f3 is the focal length of said third lens unit G3, fF is the focal length of said front group GF, fR is the focal length of said rear group GR, fW is the focal length of the whole system at the wide angle end, IIRT is the third-order comatic aberration coefficient of said rear group GR at the telephoto end when the focal length at the telephoto end is normalized into 1, D is the on-axis lens thickness of said positive lens LR1, $\nu P$ is the average value of the Abbe numbers of the positive lenses in said rear group GR, and $\nu N$ is the average value of the Abbe numbers of the negative lenses in said rear group GR.

The present invention is of a three-unit construction which comprises, in succession from the object side, a positive lens unit, a positive lens unit and a negative lens unit and in which the spacing between the first lens unit and the second lens unit is increased and the spacing between the second lens unit and the third lens unit is decreased, whereby during the magnification change from the wide angle end to the telephoto end, the imaging magnifications of the second lens unit and the third lens unit are both increased to achieve a high zoom ratio. The construction of the present invention, as compared with a zoom lens of two-unit construction comprising a positive lens unit and a negative lens unit, is advantageous in brightening the F value at the telephoto end. Also, the positive second lens unit has strong refractive power and therefore, for good correction of aberrations, particularly distortion, it is advantageous to construct the second lens unit of a front group of weak refractive power and a rear group of positive refractive power.

The conditional expressions of the present invention will hereinafter be described.

Conditional expression (1) prescribes the relations between the focal length f2 of the second lens unit G2 of the zoom lens and the focal length fF of the front group GF in the second lens unit. If the upper limit of conditional expression (1) is exceeded, the refractive power of the front group will become great in the positive and it will become impossible to correct positive distortion which are liable to occur in the first lens unit and the third lens unit. If the upper limit of this conditional expression is 0 or less, distortion can be corrected better. On the other hand, if the lower limit of conditional expression (1) is exceeded, the refractive power of the front group will become great in the negative, and to secure positive refractive power by the entire second lens unit, it will be necessary to strengthen the positive refractive power of the rear group in the second lens unit. Therefore, the correction of spherical aberration and coma will become difficult. Further, the deterioration of performance when there is mutual eccentricity between said front group and said rear group will become remarkable.

Conditional expression (2) is a condition which prescribes the relations between the focal length f2 of the second lens unit G2 of the zoom lens and the focal length fR of the rear group GR in the second lens unit. If the upper limit of conditional expression (2) is exceeded, the refractive power of the rear group will become great in the positive and the correction of spherical aberration and coma will become difficult. Further, the deterioration of performance when there is mutual eccentiricity between the front group and the rear group will become remarkable. On the other hand, if the lower limit of conditional expression (2) is exceeded, the refractive power of the rear group will become weak and it will become impossible to secure the air gap between the second lens unit and the third lens unit during the magnification change to the telephoto end.

Conditional expression (3) prescribes the relations between the focal length fW of the whole zoom lens system and the focal length f1 of the first lens unit G1. If the upper limit of conditional expression (3) is exceeded, the refractive power of the first lens unit will become great in the positive and the position of the combined principal point of the first lens unit and the second lens unit will become near to the first lens unit and it will become impossible to secure the air gap between the second lens unit and the third lens unit during the magnification change to the telephoto end. On the other hand, if the lower limit of conditional expression (3) is exceeded, the refractive power of the first lens unit will become weak and the action of converging a light beam will become small. Therefore, to brighten the F value at the telephoto end, a stop and the second lens unit near the stop will become bulky, and this is not preferable.

Conditional expression (4) is a condition which prescribes the relations between the focal length fW of the whole lens system and the focal length f2 of the second lens unit G2. If the upper limit of conditional expression (4) is exceeded, the refractive power of the second lens unit will become great in the positive and the correction of negative spherical aberration and coma will become difficult. On the other hand, if the lower limit of conditional expression (4) is exceeded, the refractive power of the second lens unit will become weak and it will become difficult to secure the back focal length at the wide angle end.

Conditional expression (5) prescribes the relations between the focal length fW of the whole zoom lens system and the focal length f3 of the third lens unit G3. If the upper limit of conditional expression (5) is exceeded, the refractive power of the third lens unit will become great in the negative and correction of positive distortion and positive spherical aberration will become difficult. On the other hand, if the lower limit of conditional expression (5) is exceeded, the refractive power of the third lens unit will become weak and it will become impossible to secure the air gap between the second lens unit and the third lens unit during the magnification change to the telephoto end.

Conditional expression (6) is a condition which prescribes the appropriate range of the third-order comatic aberration coefficient IIRT of the rear group in the second lens unit at the telephoto end when the focal length at the telephoto end is normalized into 1. If any of the upper limit and lower limit of conditional expression (6) is exceeded, coma occurring in the rear group will become great and therefore the spacing tolerance and eccentricity tolerance between the front group and the rear group in the second lens unit will become severe. Particularly, a serious problem will arise when a stop is disposed between the front group and the rear group.

It is optimal for the stop of the zoom lens of the present invention to be disposed between the front group and the rear group. Of course, it is also possible to dispose the stop immediately forwardly of the front group or immediately rearwardly of the rear group or within the rear group. In any case, however, it is desirable that the stop and the second lens unit be moved as a unit during zooming.

Now, the above-mentioned third-order comatic aberration coefficient IIRT will hereinafter be described. When the object point is at infinity, let it be assumed that the initial values (incidence height and converted angle of inclination) of the follow-ups of two paraxial rays corresponding to a paraxial marginal ray and a paraxial principal ray are defined as $h1=1$ and $\alpha 1=0$, respectively, and $$\bar{h}1 = -(t1/N1), \bar{\alpha}1 = 1,$$

where $+1$ is the on-axis distance from the first lens surface to the entrance pupil, and N1 is the refractive index of the medium more adjacent to the object side than to the first lens surface.

Let it be assumed that the amounts of paraxial follow-up corresponding to the paraxial marginal ray and the paraxial principal ray on the $\nu$th surface are $h\nu$ and $\alpha\nu$, respectively, and $$h\nu, \bar{\alpha}\nu.$$

Also, let it be assumed that the converted angle of inclination of the paraxial marginal ray emerging from the $\nu$th surface is $\alpha\nu$, the refractive index of the medium immediately forward of the $\nu$th surface is $N\nu$, the refractive index of the medium immediately rearward of the $\nu$th surface is $N\nu'$, the radius of curvature of the $\nu$th surface is $r\nu$, the distance from a point at which the paraxial marginal ray incident on the $\nu$th surface intersects the optical axis to the vertex of the $\nu$th surface is $s\nu'$, the distance from a point at which the paraxial marginal ray emerging from the $\nu$th surface intersects the optical axis to the vertex of the $\nu$th surface is $s\nu'$, the distance from a point at which the paraxial principal ray incident on the $\nu$th surface intersects the optical axis to the vertex of the $\nu$th surface is $t\nu$, the distance from a point at which the paraxial principal ray emerging from the $\nu$th surface intersects the optical axis to the vertex of the $\nu$th surface is $t\nu'$, and the fourth-order aspherical surface coefficient of the $\nu$th surface is $b\nu$ (when the $\nu$th surface is a spherical surface, $b\nu=0$).

The following auxiliary amounts are determined by the use of these.

$$h\nu \cdot Q\nu \equiv h\nu \cdot N\nu(r\nu^{-1} - s\nu^{-1}) = (h\nu \cdot N\nu \cdot r\nu^{-1}) - \alpha\nu$$

$$\bar{h}\nu \cdot \bar{Q}\nu \equiv \bar{h}\nu \cdot N\nu(r\nu^{-1} - t\nu^{-1}) = (\bar{h}\nu \cdot N\nu \cdot r\nu^{-1}) - \bar{\alpha}\nu$$

$$h\nu \cdot \Delta\nu \cdot Ns^{-1} \equiv h\nu\{(N\nu' \ s\nu')^{-1} - (N\nu \cdot s\nu)^{-1}\} =$$

$$(\alpha\nu' \cdot N\nu^{-2}) - (\alpha\nu \cdot N\nu^{-2})$$

$$\psi\nu \equiv (N\nu' - N\nu)b\nu$$

From the above auxiliary amounts, the third-order comatic aberration coefficient II$\nu$ of the $\nu$th surface is expressed as follows:

$$II\nu = h\nu^3 \cdot \bar{h}\nu\{(Q\nu \cdot \bar{Q}\nu \cdot \Delta\nu \cdot Ns^{-1}) + \psi\nu\}$$

Since the value of the aberration coefficient of an optical system is the algebraic sum of the aberration coefficients on respective surfaces, the third-order comatic aberration coefficient IIij of the partial system from the ith surface to the jth surface can be found from the following equation:

$$IIij = \sum_{\nu=i}^{j} II\nu$$

The aberration coefficients are described in detail in Yoshiya Matsui: *The Lens Designing Method* (Optical Techniques Series 1, published by Kyoritsu Publishing Co., Ltd.).

It is desirable that a lens construction satisfying conditional expression (6) which prescribes the appropriate range of the third-order comatic aberration coefficient found as described above be a construction in which the rear group in the second lens unit has, in succession from the object side, at least one positive lens LR1, at least one negative lens and at least one positive lens. Such a construction is suitable for suppressing the occurrence of coma small and yet well-balancedly correcting off-axis aberrations such as distortion and astigmatism as the whole lens system.

Conditional expression (7) is a condition which prescribes the optimum range of the on-axis lens thickness D of the positive lens LR1 in the rear group in the second lens unit. If the lower limit of conditional expression (7) is exceeded, it will be difficult to make the correction of coma in the rear group and the correction of the off-axis aberrations in the whole lens system compatible. On the other hand, if the upper limit of conditional expression (7) is exceeded, the on-axis thickness of the rear group will become great, and this will give rise to a problem that the zoom lens will become bulky and that it will become difficult to secure the spacing between the lens units during zooming.

To correct on-axis chromatic aberration and chromatic difference of magnification well from the wide angle end to the telephoto end of the zoom lens, it is desirable to make the rear group in the second lens unit sufficiently achromatized.

Conditional expression (8) is a condition for sufficiently achromatizing said rear group. If the lower limit of conditional expression (8) is exceeded, it will be difficult to make the correction of on-axis chromatic aberration and the correction of chromatic difference of magnification in the whole zoom lens compatible. Further, when the front group and rear group in the second lens unit become eccentric, chromatic difference of magnification will occur greatly and will deteriorate the quality of image, and this is not preferable.

To effect the correction of chromatic aberration and the correction of spherical aberration well, it is desirable that any positive lens and any negative lens in the rear group be cemented together.

Further, in correcting coma and off-axis aberrations, it is effective to prescribe the object side surface of the positive lens LR1 in the rear group in the second lens unit to a concave surface. The following conditional expression (9) is a condition which prescribes the lens shape of the positive lens LR1, and when the radius of curvature of the object side surface of the positive lens LR1 is R, it is desirable to satisfy the following condition:

$$-12.2 \leq R/fR \leq -0.2 \qquad (9)$$

DESCRIPTION OF THE PREFERRED EMBODIMENTS

Embodiments of the present invention will hereinafter be described.

Each embodiment is a zoom lens having, in succession from the object side, a first lens unit G1 having positive refractive power, a second lens unit G2 comprising a front group GF of weak refractive power and a rear group GR of positive refractive power and having positive refractive power as a whole, and a third lens unit G3 having negative refractive power, the spacing between the first lens unit G1 and the second lens unit G2 being increased and the spacing between the second lens unit G2 and the third lens unit G3 being decreased during the magnification change from the wide angle end to the telephoto end.

EMBODIMENT 1

Figure 1:
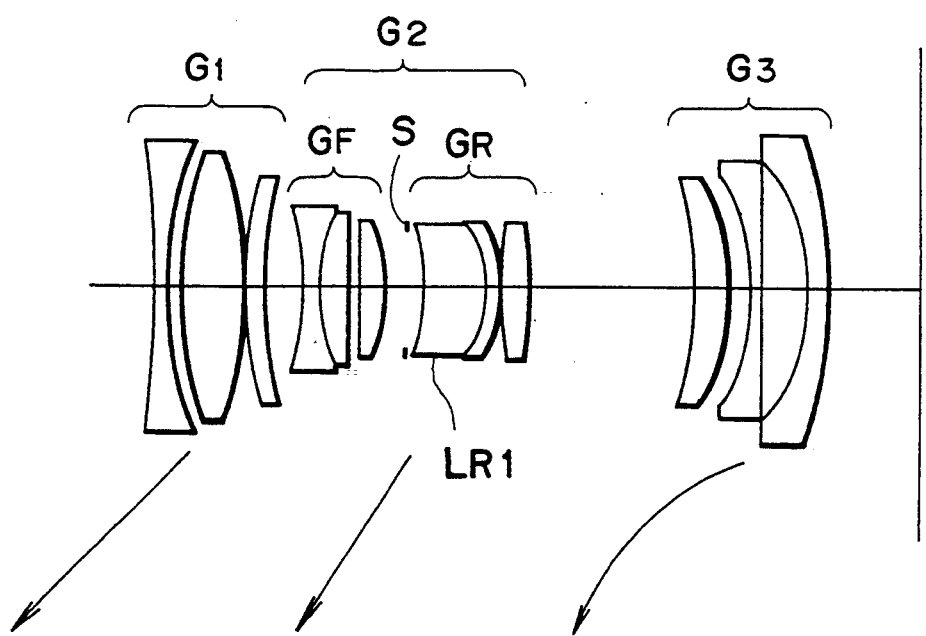
FIG. 1 shows the lens construction of Embodiment 1.

FIG. 1 shows the lens construction of Embodiment 1. The zoom lens of this embodiment is comprised, in succession from the object side, of a first lens unit G1 comprising a biconcave negative lens, a biconvex positive lens and a positive meniscus lens having its convex surface facing the object side, a front group GF in a second lens unit G2 comprising a cemented lens comprising a biconcave negative lens and a biconvex positive lens cemented together, and a positive meniscus lens having its concave surface facing the object side, a stop S, a rear group GR in the second lens unit G2 comprising a cemented lens comprising a positive meniscus lens having its concave surface facing the object side and a negative meniscus lens having its concave surface facing the object side, the positive meniscus lens and the negative meniscus lens being cemented together, and a biconvex positive lens, and a third lens unit G3 comprising a positive meniscus lens having its concave surface facing the object side, a negative meniscus lens having its concave surface facing the object side, and a negative meniscus lens having its concave surface facing the object side.

The numerical data of Embodiment 1 of the present invention are given in Table 1 below. In this table, f represents the focal length, F represents F number, and $2\omega$ represents the angle of view. The numbers at the left end represent the order from the object side, r represents the radius of curvature of each lens surface, d represents the spacing between adjacent lens surfaces, and n and $\nu$ are the values of refractive index and Abbe number, respectively, for d line ($\gamma$587.6 nm).

TABLE 1

| f = 39.00–102.00 |||| 
| F = 4.08–8.05 |||| 
| 2ω = 57.20°–23.32° ||||

| | r | d | ν | n |
|---|---|---|---|---|
| 1 | −114.155 | 1.50 | 33.9 | 1.80384 |
| 2 | 34.074 | 1.00 | | |
| 3 | 34.383 | 5.30 | 54.0 | 1.61720 |
| 4 | −45.270 | 0.10 | | |
| 5 | 30.065 | 2.60 | 60.1 | 1.62041 |
| 6 | 73.586 | (d6) | | |
| 7 | −22.875 | 1.10 | 46.5 | 1.80411 |
| 8 | 13.576 | 3.10 | 28.2 | 1.74000 |
| 9 | −88.720 | 0.80 | | |
| 10 | −491.918 | 2.00 | 64.1 | 1.51680 |
| 11 | −19.079 | 2.00 | | |
| 12 | (stop) | 2.00 | | |
| 13 | −14.370 | 5.70 | 69.9 | 1.51860 |
| 14 | −9.069 | 1.40 | 23.0 | 1.86074 |
| 15 | −13.774 | 0.10 | | |
| 16 | 70.726 | 2.70 | 69.9 | 1.51860 |
| 17 | −26.349 | (d17) | | |
| 18 | −47.072 | 3.40 | 27.6 | 1.75520 |
| 19 | −18.922 | 2.20 | | |
| 20 | −17.796 | 1.30 | 43.3 | 1.84042 |
| 21 | −124.763 | 4.00 | | |
| 22 | −16.876 | 1.40 | 55.6 | 1.69680 |
| 23 | −46.779 | (B.f) | | |

| (variable spacing during magnification change) ||||
|---|---|---|---|
| f | 38.9998 | 69.9996 | 101.9998 |
| d6 | 3.2347 | 10.3035 | 17.0677 |
| d17 | 15.0298 | 7.2691 | 3.1954 |
| B.f | 8.9728 | 31.0851 | 48.8923 |

(condition-corresponding values)

TABLE 1-continued (1) f2/fF = −0.020
(2) f2/fR = 0.872
(3) fW/f1 = 0.623
(4) fW/f2 = 1.246
(5) fW/f3 = −1.609
(6) IIRT = 0.661
(7) D/fR = 0.159
(8) νP − νN = 46.9
(9) R/fR = −0.401

EMBODIMENT 2

Figure 2:
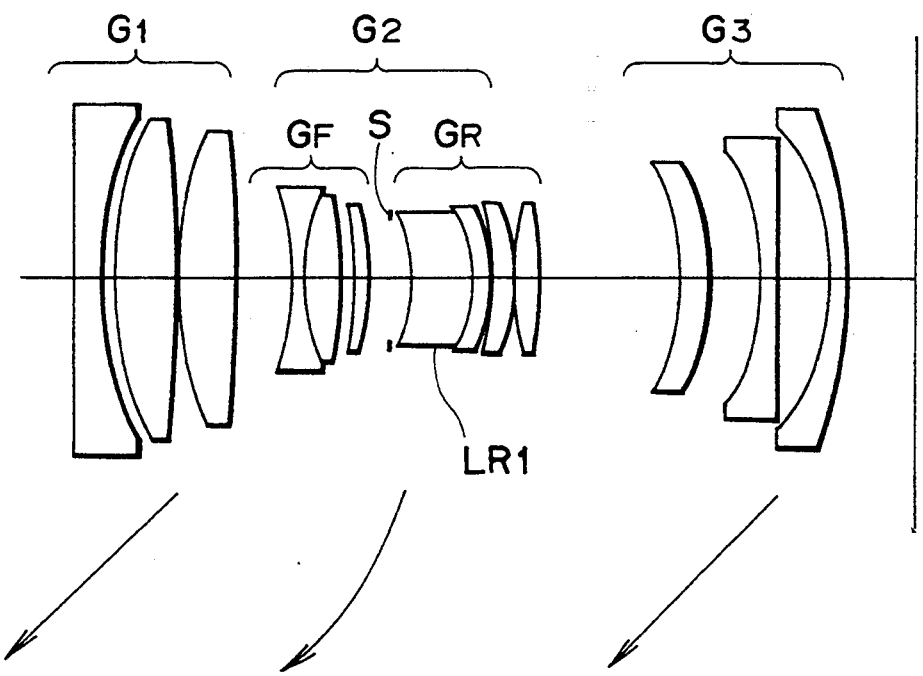
FIG. 2 shows the lens construction of Embodiment 2.

FIG. 2 shows the lens construction of Embodiment 2. The zoom lens of this embodiment is comprised, in succession from the object side, of a first lens unit G1 comprising a biconcave negative lens, a biconvex positive lens and a biconvex positive lens, a front group GF in a second lens unit G2 comprising a cemented lens comprising a biconcave negative lens and a biconvex positive lens cemented together, and a positive meniscus lens having its concave surface facing the object side, a stop S, a rear group GR in the second lens unit G2 comprising a cemented lens comprising a positive meniscus lens having its concave surface facing the object side and a negative meniscus lens having its concave surface facing the object side, the positive meniscus lens and the negative meniscus lens being cemented together, a positive meniscus lens having its concave surface facing the object side, and a biconvex positive lens, and a third lens unit G3 comprising a positive meniscus lens having its concave surface facing the object side, a nearly plano-concave concave meniscus lens having its concave surface facing the object side, and a negative meniscus lens having its concave surface facing the object side.

During zooming, the first lens unit G1 and the third lens unit G3 are moved as a unit. The numerical data of Embodiment 2 of the present invention are given in Table 2 below.

TABLE 2 f = 38.96–101.99
F = 3.92–8.14
2ω = 57.32°–23.49°

| | r | d | ν | n |
|---|---|---|---|---|
| 1 | −270.801 | 1.50 | 43.3 | 1.84042 |
| 2 | 27.974 | 1.40 | | |
| 3 | 30.217 | 5.80 | 82.6 | 1.49782 |
| 4 | −120.608 | 0.10 | | |
| 5 | 32.131 | 5.50 | 67.9 | 1.59319 |
| 6 | −94.084 | (d6) | | |
| 7 | −30.560 | 1.20 | 46.5 | 1.80411 |
| 8 | 15.695 | 3.00 | 27.6 | 1.74077 |
| 9 | −63.482 | 1.40 | | |
| 10 | −74.613 | 1.50 | 65.7 | 1.46450 |
| 11 | −22.711 | 2.00 | | |
| 12 | (stop) | 2.00 | | |
| 13 | −13.794 | 5.70 | 82.6 | 1.49782 |
| 14 | −9.913 | 1.40 | 23.8 | 1.84666 |
| 15 | −16.252 | 0.10 | | |
| 16 | −46.718 | 2.00 | 70.4 | 1.48749 |
| 17 | −17.605 | 0.10 | | |
| 18 | 58.479 | 1.70 | 70.4 | 1.48749 |
| 19 | −51.884 | (d19) | | |
| 20 | −25.121 | 3.00 | 25.4 | 1.80518 |
| 21 | −20.048 | 5.20 | | |
| 22 | −19.167 | 1.30 | 60.0 | 1.64000 |
| 23 | −10668.908 | 5.00 | | |
| 24 | −20.265 | 1.40 | 60.0 | 1.64000 |
| 25 | −42.976 | (B.f) | | |

(variable spacing during magnification change)

| f | 38.9614 | 69.9603 | 101.9946 |
|---|---|---|---|

TABLE 2-continued

| d6 | 4.8200 | 12.6413 | 16.3480 |
|---|---|---|---|
| d19 | 13.6289 | 5.8075 | 2.1009 |
| B.f | 6.7975 | 28.2677 | 49.6732 |

(condition-corresponding values)

(1) f2/fP = −0.057
(2) f2/fR = 0.920
(3) fW/f1 = 0.623
(4) fW/f2 = 1.246
(5) fW/f3 = −1.609
(6) IIRT = 0.862
(7) D/fR = 0.168
(8) νP − νN = 50.7
(9) R/fR = −0.406

In both of Embodiment 1 and Embodiment 2, during the focusing from infinity to the close distance, the third lens unit G3 is moved toward the image plane to thereby reduce the variation in the imaging performance and the amount of focusing movement.

The construction of the present invention also enables focusing to be accomplished by the entire second lens unit or only the rear group in the second lens unit being moved toward the object side.

Also, only the rear group in which aberrations have been corrected relatively well is moved in a direction orthogonal to the optical axis, whereby the present invention can be applied to the correction of camera shake or the like. If in this case, the rear group is designed to satisfy conditional expression (9), the deterioration of the imaging performance when the rear group is greatly moved for the correction of camera shake is suitably reduced.

It is also possible to further reduce the fluctuation of aberrations such as curvature of image field by slightly varying the spacing between the front group and the rear group in the second lens unit during zooming or during focusing.

Also, when aberrations are corrected well in each of the front group and the rear group, it can be made more difficult for eccentricity to occur in each lens chamber and the spacing tolerance and eccentricity tolerance between the front group and the rear group in the second lens unit can be made looser by making the front group and the rear group in the second lens unit into discrete lens chambers than by effecting aberration correction by the entire second lens unit and therefore, it is unnecessary to effect the alignment of the optical axis strictly and thus, high mass productivity can be maintained. This is particularly effective when the stop is disposed between the front group and the rear group.

What is claimed is:

1. A zoom lens having, in succession from the object side, a first lens unit G1 having positive refractive power, a second lens unit G2 having positive refractive power, and a third lens unit G3 having negative refractive power, the spacing between said first lens unit G1 and said second lens unit G2 being increased and the spacing between said second lens unit G2 and said third lens unit G3 being decreased during the magnification change from the wide angle end to the telephoto end, said first lens unit G1 having at least one positive lens and at least one negative lens, said second lens unit G2 comprising, in succession from the object side, a front group GF of weak refractive power and a rear group GR of positive refractive power, said front group GF having at least one negative lens and at least one positive lens, said rear group GR having at least one positive lens and at least one negative lens, said third lens unit G3 having at least one positive lens and at least one negative lens, said zoom lens satisfying the following conditions:

$$-0.3 \leq f2/fF \leq 0.3$$
$$0.7 \leq f2/fR \leq 1.3$$
$$0.4 \leq fW/f1 \leq 0.8$$
$$1.0 \leq fW/f2 \leq 1.5$$
$$1.0 \leq |fW/f3| \leq 2.0, f3 < 0$$
$$-1.0 \leq IIRT \leq 3.0$$

ps where f1 is the focal length of said first lens unit G1, f2 is the focal length of said second lens unit G2, f3 is the focal length of said third lens unit G3, fF is the focal length of said front group GF, fR is the focal length of said rear group GR, fW is the focal length of the whole system at the wide angle end, and IIRT is the third-order comatic aberration coefficient of said rear group GR at the telephoto end when the focal length at the telephoto end is normalized into 1.

2. A zoom lens according to claim 1, further satisfying the following condition:

$$-0.3 \leq f2/fF \leq 0$$

3. A zoom lens according to claim 1, wherein said rear group in said second lens unit has, in succession from the object side, at least one positive lens LR1, at least one negative lens and at least one positive lens.

4. A zoom lens according to claim 1, wherein any positive lens and any negative lens in the rear group in said second lens unit are cemented together.

5. A zoom lens according to claim 1, further satisfying the following condition:

$$-1.2 \leq R/fR \leq -0.2,$$

when the object side surface of the positive lens LR1 in the rear group in said second lens unit is a concave surface and the radius of curvature of the object side surface of said positive lens is R.

6. A zoom lens according to claim 1, having a stop between the front group and the rear group in said second lens unit.

7. A zoom lens according to claim 5, wherein only the rear group in said second lens unit is moved in a direction orthogonal to the optical axis to thereby effect the correction of image vibration.

8. A zoom lens according to claim 1, wherein the spacing between the front group and the rear group in said second lens unit is slightly varied during zooming.

9. A zoom lens according to claim 1, wherein the spacing between the front group and the rear group in said second lens unit is slightly varied during focusing.

10. A zoom lens according to claim 1, wherein the focusing from infinity to the close distance is effected by said third lens unit being moved toward the image plane.

11. A zoom lens according to claim 1, having the following lens data:

| f = 39.00–102.00 | | | |
|---|---|---|---|
| F = 4.08–8.05 | | | |
| 2ω = 57.20°–23.32° | | | |

| | r | d | ν | n |
|---|---|---|---|---|
| 1 | −114.155 | 1.50 | 33.9 | 1.80384 |
| 2 | 34.074 | 1.00 | | |
| 3 | 34.383 | 5.30 | 54.0 | 1.61720 |
| 4 | −45.270 | 0.10 | | |
| 5 | 30.065 | 2.60 | 60.1 | 1.62041 |
| 6 | 73.586 | (d6) | | |
| 7 | −22.875 | 1.10 | 46.5 | 1.80411 |
| 8 | 13.576 | 3.10 | 28.2 | 1.74000 |
| 9 | −88.720 | 0.80 | | |
| 10 | −491.918 | 2.00 | 64.1 | 1.51680 |
| 11 | −19.079 | 2.00 | | |
| 12 | (stop) | 2.00 | | |
| 13 | −14.370 | 5.70 | 69.9 | 1.51860 |
| 14 | −9.069 | 1.40 | 23.0 | 1.86074 |
| 15 | −13.774 | 0.10 | | |
| 16 | 70.726 | 2.70 | 69.9 | 1.51860 |
| 17 | −26.349 | (d17) | | |
| 18 | −47.072 | 3.40 | 27.6 | 1.75520 |
| 19 | −18.922 | 2.20 | | |
| 20 | −17.796 | 1.30 | 43.3 | 1.84042 |
| 21 | −124.763 | 4.00 | | |
| 22 | −16.876 | 1.40 | 55.6 | 1.69680 |
| 23 | −46.779 | (B.f) | | |

| (variable spacing during magnification change) | | | |
|---|---|---|---|
| f | 38.9998 | 69.9996 | 101.9998 |
| d6 | 3.2347 | 10.3035 | 17.0677 |
| d17 | 15.0298 | 7.2691 | 3.1954 |
| B.f | 8.9728 | 31.0851 | 48.8923 |

(condition-corresponding values)

(1) f2/fF = −0.020
(2) f2/fR = 0.872
(3) fW/f1 = 0.623
(4) fW/f2 = 1.246
(5) fW/f3 = −1.609
(6) IIRT = 0.661
(7) D/fR = 0.159
(8) νP − νN = 46.9
(9) R/fR = −0.401 where f is the focal length, F is the F number, 2 ω is the angle of view, the numbers at the left end in the above table represent the order from the object side, r is the radius of curvature of each lens surface, d is the spacing between adjacent lens surfaces, n and ν are the values of refractive index and Abbe number, respectively, for d line (γ=587.6 nm), f1 is the focal length of the first lens unit G1, f2 is the focal length of the second lens unit G2, f3 is the focal length of the third lens unit, fF is the focal length of the front group GF in the second lens unit, fR is the focal length of the rear group in the second lens unit, fW is the focal length of the whole system at the wide angle end, IIRT is the third-order comatic aberration coefficient of the rear group GR in the second lens unit at the telephoto end when the focal length at the telephoto end is normalized into 1, D is the on-axis lens thickness of the positive lens LR1 in the rear group, νP is the average value of the Abbe numbers of the positive lenses in the rear group GR, νN is the average value of the Abbe numbers of the negative lenses in the rear group GR, and R is the radius of curvature of the object side surface of the positive lens LR1 in the rear group.

12. A zoom lens having, in succession from the object side, a first lens unit G1 having positive refractive power, a second lens unit G2 having positive refractive power, and a third lens unit G3 having negative refractive power, the spacing between said first lens unit G1 and said second lens unit G2 being increased and the spacing between said second lens unit G2 and said third lens unit G3 being decreased during the magnification change from the wide angle end to the telephoto end, said first lens unit G1 having at least one positive lens and at least one negative lens, said second lens unit G2 comprising, in succession from the object side, a front group GF of weak refractive power and a rear group GR of positive refractive power, said front group GF having at least one negative lens and at least one positive lens, said rear group GR having, in succession from the object side, at least one positive lens LR1, at least one negative lens and at least one positive lens, said third lens unit G3 having at least one positive lens and at least one negative lens, said zoom lens satisfying the following conditions:

$$-0.3 \leq f2/fF \leq 0.3$$
$$0.7 \leq f2/fR \leq 1.3$$
$$0.4 \leq fW/f1 \leq 0.8$$
$$1.0 \leq fW/f2 \leq 1.5$$
$$1.0 \leq fW/f3 \leq 2.0, f3 < 0$$
$$0.1 \leq D/fR \leq 0.3$$

where f1 is the focal length of said first lens unit G1, f2 is the focal length of said second lens unit G2, f3 is the focal length of said third lens unit G3, fF is the focal length of said front group GF, fR is the focal length of said rear group GR, fW is the focal length of the whole system at the wide angle end, and D is the on-axis lens thickness of said positive lens LR1.

13. A zoom lens according to claim 12, further satisfying the following condition:

$$-0.3 \leq f2/fF \leq 0$$

14. A zoom lens according to claim 12, wherein any positive lens and any negative lens in the rear group in said second lens unit are cemented together.

15. A zoom lens according to claim 12, further satisfying the following condition:

$$-1.2 \leq R/fR \leq -0.2,$$

when the object side surface of the positive lens LR1 in the rear group in said second lens unit is a concave surface and the radius of curvature of the object side surface of said positive lens is R.

16. A zoom lens according to claim 12, having a stop between the front group and the rear group in said second lens unit.

17. A zoom lens according to claim 15, wherein only the rear group in said second lens unit is moved in a direction orthogonal to the optical axis to thereby effect the correction of image vibration.

18. A zoom lens according to claim 12, wherein the spacing between the front group and the rear group in said second lens unit is slightly varied during zooming.

19. A zoom lens according to claim 12, wherein the spacing between the front group and the rear group in said second lens unit is slightly varied during focusing.

20. A zoom lens according to claim 12, wherein the focusing from infinity to the close distance is effected by said third lens unit being moved toward the image plane.

21. A zoom lens according to claim 12, further satisfying the following condition:

$$-1.0 \leq IIRT \leq 3.0,$$

where IIRT is the third-order comatic aberration coefficient of the rear group GR in said second lens unit at the telephoto end when the focal length at the telephoto end is normalized into 1.

22. A zoom lens according to claim 12, having the following lens data:

| f = 38.96–101.99 |||||
| F = 3.92–8.14 |||||
| 2ω = 57.32°–23.49° |||||
| | r | d | ν | n |
| --- | --- | --- | --- | --- |
| 1 | −270.801 | 1.50 | 43.3 | 1.84042 |
| 2 | 27.974 | 1.40 | | |
| 3 | 30.217 | 5.80 | 82.6 | 1.49782 |
| 4 | −120.608 | 0.10 | | |
| 5 | 32.131 | 5.50 | 67.9 | 1.59319 |
| 6 | −94.084 | (d6) | | |
| 7 | −30.560 | 1.20 | 46.5 | 1.80411 |
| 8 | 15.695 | 3.00 | 27.6 | 1.74077 |
| 9 | −63.482 | 1.40 | | |
| 10 | −74.613 | 1.50 | 65.7 | 1.46450 |
| 11 | −22.711 | 2.00 | | |
| 12 | (stop) | 2.00 | | |
| 13 | −13.794 | 5.70 | 82.6 | 1.49782 |
| 14 | −9.913 | 1.40 | 23.8 | 1.84666 |
| 15 | −16.252 | 0.10 | | |
| 16 | −46.718 | 2.00 | 70.4 | 1.48749 |
| 17 | −17.605 | 0.10 | | |
| 18 | 58.479 | 1.70 | 70.4 | 1.48749 |
| 19 | −51.884 | (d19) | | |
| 20 | −25.121 | 3.00 | 25.4 | 1.80518 |
| 21 | −20.048 | 5.20 | | |
| 22 | −19.167 | 1.30 | 60.0 | 1.64000 |
| 23 | −10668.908 | 5.00 | | |
| 24 | −20.265 | 1.40 | 60.0 | 1.64000 |
| 25 | −42.976 | (B.f) | | |
| (variable spacing during magnification change) |||||
| f | 38.9614 | 69.9603 | 101.9946 ||
| d6 | 4.8200 | 12.6413 | 16.3480 ||
| d19 | 13.6289 | 5.8075 | 2.1009 ||
| B.f | 6.7975 | 28.2677 | 49.6732 ||
| (condition-corresponding values) |||||
| (1) f2/fP = −0.057 |||||
| (2) f2/fR = 0.920 |||||
| (3) fW/f1 = 0.623 |||||
| (4) fW/f2 = 1.246 |||||
| (5) fW/f3 = −1.609 |||||
| (6) IIRT = 0.862 |||||
| (7) D/fR = 0.168 |||||
| (8) νP − νN = 50.7 |||||
| (9) R/fR = −0.406 ||||| where f is the focal length, F is the F number, 2 ω is the angle of view, the numbers at the left end in the above table represent the order from the object side, r is the radius of curvature of each lens surface, d is the spacing between adjacent lens surfaces, n and ν are the values of refractive index and Abbe number, respectively, for d line (γ=587.6 nm), f1 is the focal length of the first lens unit G1, f2 is the focal length of the second lens unit G2, f3 is the focal length of the third lens unit G3, f F is the focal length of the front group GF in the second lens unit, fR is the focal length of the rear group GR in the second lens unit, fW is the focal length of the whole system at the wide angle end, IIRT is the third-order comatic aberration coefficient of the rear group GR in the second lens unit at the telephoto end when the focal length at the telephoto end is normalized into 1, D is the on-axis lens thickness of the positive lens LR1 in the rear group, νP is the average value of the Abbe numbers of the positive lenses in the rear group GR, νN is the average value of the Abbe numbers of the negative lenses in the rear group GR, and R is the radius of curvature of the object side surface of the positive lens LR1 in the rear group.

23. A zoom lens having, in succession from the object side, a first lens unit G1 having positive refractive power, a second lens unit G2 having positive refractive power, and a third lens unit G3 having negative refractive power, the spacing between said first lens unit G1 and said second lens unit G2 being increased and the spacing between said second lens unit G2 and said third lens unit G3 being decreased during the magnification change from the wide angle end to the telephoto end, said first lens unit G1 having at least one positive lens and at least one negative lens, said second lens unit G2 comprising, in succession from the object side, a front group GF of weak refractive power and a rear group GR of positive refractive power, said first group GF having at least one negative lens and at least one positive lens, said rear group GR having at least two positive lenses and at least one negative lens, said third lens unit G3 having at least one positive lens and at least one negative lens, said zoom lens satisfying the following conditions:

$$-0.3 \leq f2/fF \leq 0.3$$
$$0.7 \leq f2/fR \leq 1.3$$
$$0.4 \leq fW/f1 \leq 0.8$$
$$1.0 \leq fW/f2 \leq 1.5$$
$$1.0 \leq fW/f3 \leq 2.0, f3 < 0$$
$$0.1 \leq D/fR \leq 0.3$$

where f1 is the focal length of said first lens unit G1, f2 is the focal length of said second lens unit G2, f3 is the focal length of said third lens unit G3, fF is the focal length of said front group GF, fR is the focal length of said rear group GR, $\nu$P is the average value of the Abbe numbers of the positive lenses in said rear group GR, and $\nu$N is the average value of the Abbe numbers of the negative lenses in said rear group GR.

24. A zoom lens according to claim 23, further satisfying the following condition:

$$-0.3 \leq f2/fF \leq 0$$

25. A zoom lens according to claim 23, wherein the rear group in said second lens unit has, in succession from the object side, at least one positive lens LR1, at least one negative lens and at least one positive lens.

26. A zoom lens according to claim 23, wherein any positive lens and any negative lens in the rear group in said second lens unit are cemented together.

27. A zoom lens according to claim 23, further satisfying the following condition:

$$-1.2 \leq R/fR \leq -0.2$$

when the object side surface of the positive lens LR1 in the rear group in said second lens unit is a concave surface and the radius of curvature of the object side surface of said positive lens is R.

28. A zoom lens according to claim 23, having a stop between the front group and the rear group in said second lens unit.

29. A zoom lens according to claim 27, wherein only the rear group in said second lens unit is moved in a direction orthogonal to the optical axis to thereby effect the correction of image vibration.

30. A zoom lens according to claim 23, wherein the spacing between the front group and the rear group in said second lens unit is slightly varied during zooming.

31. A zoom lens according to claim 23, wherein the spacing between the front group and the rear group in said second lens unit is slightly varied during focusing.

32. A zoom lens according to claim 23, wherein the focusing from infinity to the close distance is effected by said third lens unit being moved toward the image plane.

33. A zoom lens according to claim 23, further satisfying the following condition:

$$-1.0 \leq IIRT \leq 3.0,$$

where IIRT is the third-order comatic aberration coefficient of the rear group GR in said second lens unit at the telephoto end when the focal length at the telephoto end is normalized into 1.

34. A zoom lens according to claim 25, further satisfying the following condition:

$$0.1 \leq D/fR \leq 0.3$$

where D is the on-axis lens thickness of the positive lens LR1 in the rear group in said second lens unit.

* * * * *